United States Patent [19]
Sakai et al.

[11] 4,426,395
[45] Jan. 17, 1984

[54] RETORT SALAD AND ITS PRODUCTION PROCESS

[75] Inventors: Muneo Sakai; Gyota Taguchi; Kiwako Tsuji; Takashi Sakita, all of Yokohama, Japan

[73] Assignee: The Nisshin Oil Mills, Ltd., Tokyo, Japan

[21] Appl. No.: 361,156

[22] Filed: Mar. 23, 1982

[30] Foreign Application Priority Data

Mar. 23, 1981 [JP] Japan .................................. 56-40381

[51] Int. Cl.³ .............................................. A23L 1/24
[52] U.S. Cl. ........................................ 426/46; 426/63; 426/589; 426/605; 426/613; 426/404; 426/407; 426/412
[58] Field of Search .................. 426/46, 63, 589, 605, 426/613, 404, 407, 412

[56] References Cited

U.S. PATENT DOCUMENTS

| | | | |
|---|---|---|---|
| 3,965,272 | 6/1976 | Epstein et al. | 426/605 |
| 4,034,124 | 7/1977 | van Dam | 426/589 |
| 4,148,929 | 4/1979 | Gorfien | 426/605 |
| 4,163,808 | 8/1979 | De Paolis | 426/613 |
| 4,175,142 | 11/1979 | Hahn et al. | 426/613 |
| 4,293,574 | 10/1981 | Mikami et al. | 426/613 |
| 4,302,474 | 11/1981 | Mikami et al. | 426/589 |
| 4,304,795 | 12/1981 | Takada et al. | 426/613 |

*Primary Examiner*—Jeanette M. Hunter
*Attorney, Agent, or Firm*—Sughrue, Mion, Zinn, Macpeak & Seas

[57] ABSTRACT

Retort salad having improved emulsification heat stability can be produced by using mayonnaise-like food containing a partial hydrolyzate of an alcohol-denatured soybean protein with protease as an emulsifier.

6 Claims, No Drawings

RETORT SALAD AND ITS PRODUCTION PROCESS

BACKGROUND OF THE INVENTION

This invention relates to a process for producing retort salad using mayonnaise-like foods containing soybean protein as an emulsifier.

Because of the advantages of long shelf life and convenience, a variety of so-called "retort foods", that are prepared by charging foods into heat and pressure resistant containers such as cans, jars, bottles, bags, and the like and then heat sterilizing the foods at 100° C. or above, usually 120° C. or above, have been put on the market in the past. Though potato salad and tuna salad have been commercially available as the retort salad foods using mayonnaise, they fail to make the best of the good body inherent in mayonnaise because the emulsion breaks down and the vinegar and oil separate from each other.

On the other hand, mayonnaise-like foods using soybean protein as an emulsifier instead of eggs has been proposed, for example, in U.S. Pat. No. 4,163,808 and a retort salad can be produced using such mayonnaise-like foods. It is recommended to use soybean proteins which have been partially hydrolyzed with an enzyme in the production of retort salad because the proteins can considerably improve the emulsifying power. In this case too, however, the emulsifying power is in sufficient and the emulsion is likely to be broken down by heating during the retort salad production process.

SUMMARY OF THE INVENTION

It is therefore an object of the present invention to obtain a high quality retort salad whose emulsification stability is not lost even during heating.

The abovementioned object can be accomplished by a process which comprises reacting protease with an aqueous dispersion of an alcohol-denatured soybean protein to cause partial hydrolysis and then concentrating or drying the reaction product, preparing a mayonnaise-like food using the resulting partial hydrolyzate of the soybean protein as an emulsifier, mixing the food with salad raw materials, packing the mixture into a container capable of withstanding heat and pressure, and finally heat-sterilizing the contents at an elevated temperature.

The present invention has been made on the basis of the finding that when a soybean protein whose water-solubility has been lowered by alcohol-denaturation is treated with an enzyme the emulsifying power as well as emulsification stability, in particular the emulsification stability during heating, can be remarkably improved within the range from neutral to acid.

In accordance with the present invention, a retort salad is provided which has extremely high emulsification heat stability. The term "emulsification haeat stability" used herein means the property that the emulsion is not broken down when a salad using the mayonnaise-like food is packed into a heat and pressure resistant container and heat-sterilized at a temperature of 100° C. or above after deairing and sealing.

DESCRIPTION OF THE PREFERRED EMBODIMENTS

The soybean proteins to be used in the process of the present invention may be any of the ordinary skimmed soybeans, extracted soybean protein, concentrated soybean protein and isolated soybean protein. These starting soybean proteins are washed with an alcohol, preferably with aqueous ethanol. Washing with the alcohol is carried out in the customary manner wherein the alcohol concentration is medium ranging from about 50 to 80%, the solvent ratio is about 5 to 20 times by weight and the washing temperature is preferably below the boiling point at the alcohol concentration employed. It is of course possible to use alcohol steam. By this washing, the soybean protein is denatured to an ordinary nitrogen solubility index of below 20 and its solubility is lowered. The higher the degree of denaturation, the more favourable the influence upon the emulsification stability.

The emulsifying power of the alcohol-denatured soybean protein is low, but when it is partially hydrolyzed with an enzyme the soybean protein acquires excellent emulsification heat stability, which is the characterizing feature of the present invention. Partial hydrolysis is effected in the following manner. The alcohol-denatured soybean protein is added to and dispersed in water and the pH is adjusted. While neutral or alkaline protease such as "Bioprase" (a product of Nagase Sangyo K.K.), papain or "Alkarase" (a product of Novo Co.) is being added and the dispersion is stirred, it is subjected to the enzymolysis. It is preferred in this case that the soybean protein is hydrolyzed at the optimal pH and temperature of the particular enzyme being used.

Hydrolysis is terminated at a point where the solubility ratio of protein in trichloroacetic acid (hereinafter referred to as "TCA solubility ratio") reaches 8 to 35%, preferably 10 to 25%. If the TCA solubility ratio is below 8%, the emulsification heat stability of the resulting retort salad is poor and the oil separates out. If the ratio exceeds 35%, on the other hand, both emulsification stability and emulsification heat stability become undesirably inferior. When the protein solution hydrolyzed to the intended TCA solubility ratio is heated (generally to 90° C. or above), the enzyme is inactivated. After the enzyme is inactivated, the protein is concentrated or dried after insoluble matters are either removed or not.

Using the thus obtained partially hydrolyzed soybean protein as the emulsifier, fats, vinegar, seasonings and the like are mixed and emulsified to provide a mayonnaise-like food. The amount of the soybean protein used is 0.5 to 10%, preferably 1 to 5%, calculated as dry weight over the total weight of the mayonnaise-like food. If the amount is below 0.5%, the emulsification heat stability of the retort salad becomes inferior and the oil separates. If the amount exceeds 10%, the emulsification heat stability of the retort salad can be improved but the viscosity of the mayonnaise-like food itself becomes so high that it cannot be mixed smoothly with the salad materials.

The mayonnaise-like food obtained in this manner is then mixed with the raw materials for the salad such as fishmeat, meat of poultry, tissue-like soybean proteins, vegetables, seasonings, condiments, and so forth. As the salad raw materials, fishmeat flakes such as of tuna and victorfish, loosened chicken white meat, tissue-like soybean flakes restored by water, boiled and mashed potato, sliced onion, sweetcorn powder, seasoning, condiments, and so forth can be used either alone or in combination.

The mixture of salad material and mayonnaise-like food is packed into a can, a jar, a heat-resistant bag or a bag-like container, deaired and sealed, then placed in a sterilization oven and heated to be heat sterilized for a sufficient period at a temperature (generally 100° C. or above) at which heat-resistant bacteria are killed. A retort salad having extremely high emulsification heat stability is thus obtained.

Hereinafter, the present invention will be described in further detail with reference to Examples thereof which are merely illustrative and in no way limiting. In the Examples, the terms "part" or "parts" mean the "part by weight" or "parts by weight".

EXAMPLE 1

10 Kg of lowly denatured skimmed soybean was washed with 100 Kg of 60 wt% aqueous ethanol solution inside a sealed tank at 50° C. for 30 minutes. Filtration of the solution provided 15.5 Kg of cake. When the cake was dried and then milled by a vacuum dryer, 6.8 Kg of concentrated soybean protein was obtained in a powder form having 6.3% moisture content, 68% of crude protein (calculated as an anhydride) and 10.5 of NSI. The protein was placed into a tank conteining 75 l of hot water at 60° C. and equipped with a jacket, and was stirred and dispersed. The pH was adjusted to 8.5 with sodium hydroxide. After 25 g of "Bioprase SP-4" (a product of Nagase Sangyo K.K.) was added, the protein was hydrolyzed at 56° C. for 60 minutes. The pH was further adjusted to 9.5 with sodium hydroxide, and the enzyme was inactivated by heating to 92° C. for 15 minutes. The TCA solubility ratio of the product was 12.8%. The TCA solubility ratio was determined in the following manner: 10% aqueous solution of the sample and the same amount of 20% aqueous trichloroacetic acid solution were mixed and were left to stand for 60 minutes. After insoluble matter was removed, nitrogen in the supernatant was determined by the Kjeldahl method and the solubility of the sample with respect to the total nitrogen was expressed as a percentage.

The partially hydrolyzed protein solution was neutralized with hydrochloric acid, vacuum concentrated, and spray-dried to give 6.1 Kg of the intended soybean protein.

600 parts of soybean salad oil, 150 parts of vineger, 180 parts of water and 45 parts of seasoning were added to 25 parts of the soybean protein obtained above and were homogeneously mixed and emulsified to give a mayonnaise-like food. Both the soybean protein and the seasoning were dispersed and dissolved in the water in advance, and while they were being stirred with a Homomixer the soybean salad oil was added dropwise to be emulsified, followed by addition of the vinegar.

130 parts of the mayonnaise-like food were mixed with 660 parts of potato that had been boiled, peeled, and then mashed, 70 parts of sweetcorn grains, 60 parts of carrot that was cut in about 5 mm cubes and boiled, 70 parts of onion sliced in a 3 cm-length and 10 parts of seasoning including salt, sugar, white pepper, etc. to make a potato salad.

About 100 g of this potato salad was packed in a heat-resistant plastic film bag, which was then deaired and sealed by a heat-fusion bonding device equipped with a vacuum pump. The bag was then placed in a sterilizing oven, heated and sterilized for 4 minutes after the temperature of the center of the bag reached 120° C., and cooled to give the retort potato salad.

This product had a stable emulsion and the mayonnaise had good body as the vinegar and oil did not separate from each other. The emulsion remained stable even after the product was stored at 37° C. for 3 months.

For comparison, three kinds of mayonnaise or mayonnaise-like foods were prepared in the same way as in Example 1 using, as the emulsifier, the soybean protein of Example 1, the egg yolk as a Comparative Example 1 and a partially hydrolyzed soybean protein not denatured with alcohol (TCA solubility ratio 13.5%) prepared by reacting the lowly denatured skimmed soybean with "Bioprase" in the same way as Example 1, respectively. Using the mayonnaise or mayonnaise-like foods, three kinds of retort salads were prepared, their emulsification heat stabilities were compared, and the results are shown in Table 1.

TABLE 1

Emulsification heat stability of emulsifiers (% by weight of total weight of isolated oil)

| Emulsifier | Mayonnaise or mayonnaise-like food | Retort potato salad[1] |
|---|---|---|
| Soybean protein of this Invention | 0 | 0 (0) |
| Egg yolk | 11.3 | 2.1 (16.2) |
| Partially hydrolyzed soybean protein not alcohol-denatured | 4.6 | 1.4 (9.6) |

Remarks [1]The value in the parenthesis represents weight percentage based on the amount of mayonnaise or mayonnaise-like food the isolated oil was added to.

The same amount of egg yolk, calculated as dry, as of the soybean protein was added, and the water content was adjusted.

The emulsification heat stability of the mayonnaise or mayonnaise-like foods was expressed by the weight percentage of the total amount of separated oil when about 200 g of mayonnaise or mayonnaise-like food was packed into a vinylidene chloride casing having a bent diameter of 55 mm, sealed and heated to 80° C. for 30 minutes and thereafter centrifuged at 2,000 rpm after cooling to isolate the oil. The emulsification heat stability of each retort potato salad was also measured in the same way.

The mayonnaise-like food and retort salad using the soybean protein in accordance with the present invention exhibited better emulsification heat stability during heating than those which used the egg yolk and the partially hydrolyzed soybean protein not denatured with alcohol.

EXAMPLE 2

A tuna salad was prepared by mixing 300 parts of the mayonnaise-like food of Example 1 with 300 parts of tuna flakes, 140 parts of onion sliced in a length of 3 cm and 10 parts of seasonings such as mustard powder, sodium glutaminate, white pepper, and so forth.

About 200 g of this tuna salad was packed in a heat-resistant plastic film bag and deaired and sealed in the same way as in Example 1. The bag was then placed into a high temperature quick sterilization oven. After the temperature at the center of the bag reached 135° C., heat-sterilization was effected for 20 seconds. The bag was cooled to give the retort tuna salad.

The salad had stable emulsification and the vinegar and oil did not separate. The salad had the good body and taste inherent in the mayonnaise and its emulsion remained stable even after storage at 37° C. for 3 months.

What is claimed is:

1. A process for producing a retort salad having improved emulsification heat stability, comprising:
   reacting protease with an aqueous dispersion of an alcohol-denatured soybean protein so as to cause partial hydrolysis;
   concentrating or drying the protein;
   preparing a mayonnaise-like food using the resulting soybean protein thus partially hydrolyzed as an emulsifier;
   mixing the mayonnaise-like food with raw salad materials;
   packing the mixture into a heat and pressure resistant container;
   deairing and sealing the container; and then heat-sterilizing the container at an elevated temperature.

2. The process for producing a retort salad as defined in claim 1 wherein the nitrogen solubility index of the alcohol-denatured soybean protein is up to 20.

3. The process for producing a retort salad as defined in claim 1 wherein partial hydrolysis is carried out until the TCA solubilization ratio of the soybean protein reaches 0.8 to 35%.

4. The process for producing a retort salad as defined in claim 1 wherein the content of the partially hydrolyzed soybean protein in the mayonnaise-like food is 0.5 to 10%, calculated as its dry weight.

5. The process for producing a retort salad as defined in claim 1 wherein the heat-sterilization temperature is 100° C. or above.

6. A retort salad produced by the process of any of claims 1 through 5.

* * * * *